(12) United States Patent
Steiner

(10) Patent No.: US 8,096,596 B2
(45) Date of Patent: Jan. 17, 2012

(54) BUMPER BEAM FOR A VEHICLE

(75) Inventor: Thomas Steiner, Rosvik (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 12/735,910

(22) PCT Filed: Feb. 2, 2009

(86) PCT No.: PCT/SE2009/000065
§ 371 (c)(1),
(2), (4) Date: Aug. 24, 2010

(87) PCT Pub. No.: WO2009/108098
PCT Pub. Date: Sep. 3, 2009

(65) Prior Publication Data
US 2010/0320781 A1 Dec. 23, 2010

(30) Foreign Application Priority Data
Feb. 28, 2008 (SE) ........................................ 0800466

(51) Int. Cl.
*B60R 19/24* (2006.01)
(52) U.S. Cl. ...................................................... 293/155

(58) Field of Classification Search .................. 293/133, 293/155
See application file for complete search history.

(56) References Cited

U.S. PATENT DOCUMENTS

| | | | |
|---|---|---|---|
| 4,079,975 A | 3/1978 | Matsuzaki et al. | |
| 4,413,856 A | 11/1983 | McMahan et al. | |
| 4,460,206 A * | 7/1984 | Peter | 293/132 |
| 5,271,650 A * | 12/1993 | Fukuhara et al. | 293/120 |
| 5,829,805 A | 11/1998 | Watson | |
| 5,876,077 A | 3/1999 | Miskech et al. | |
| 7,703,820 B2 * | 4/2010 | Perarnau Ramos et al. | 293/155 |
| 2004/0207217 A1 * | 10/2004 | Muller et al. | 293/133 |

\* cited by examiner

*Primary Examiner* — Dennis Pedder
(74) *Attorney, Agent, or Firm* — Mark P. Stone

(57) ABSTRACT

A bumper beam for a vehicle has two attachment portions (15, 16) with a U-shaped cross section open towards the vehicle. Each attachment portion has a reinforcing member (29) in the form of a hat-profile located within the attachment portion and across the latter, with its webs (31, 32) welded to the webs (13, 14) of the attachment portion. The side flanges (33, 34) of the hat profile have holes (35, 36) for bolts by means of which the side flanges and thereby the bumper beam can be attached to a structural part of the vehicle and the attachment section has holes (41) to allow fastening bolts of this kind to be fastened through these holes.

5 Claims, 2 Drawing Sheets

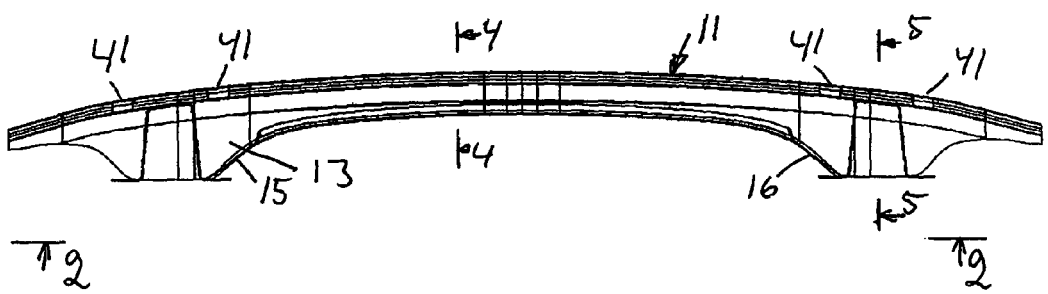
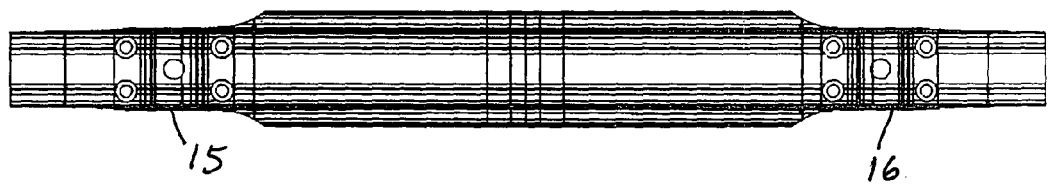
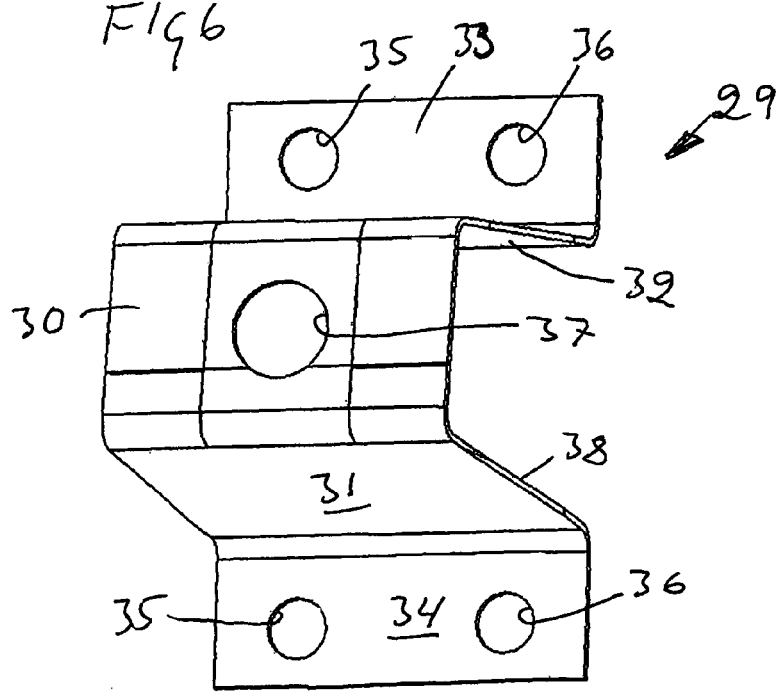

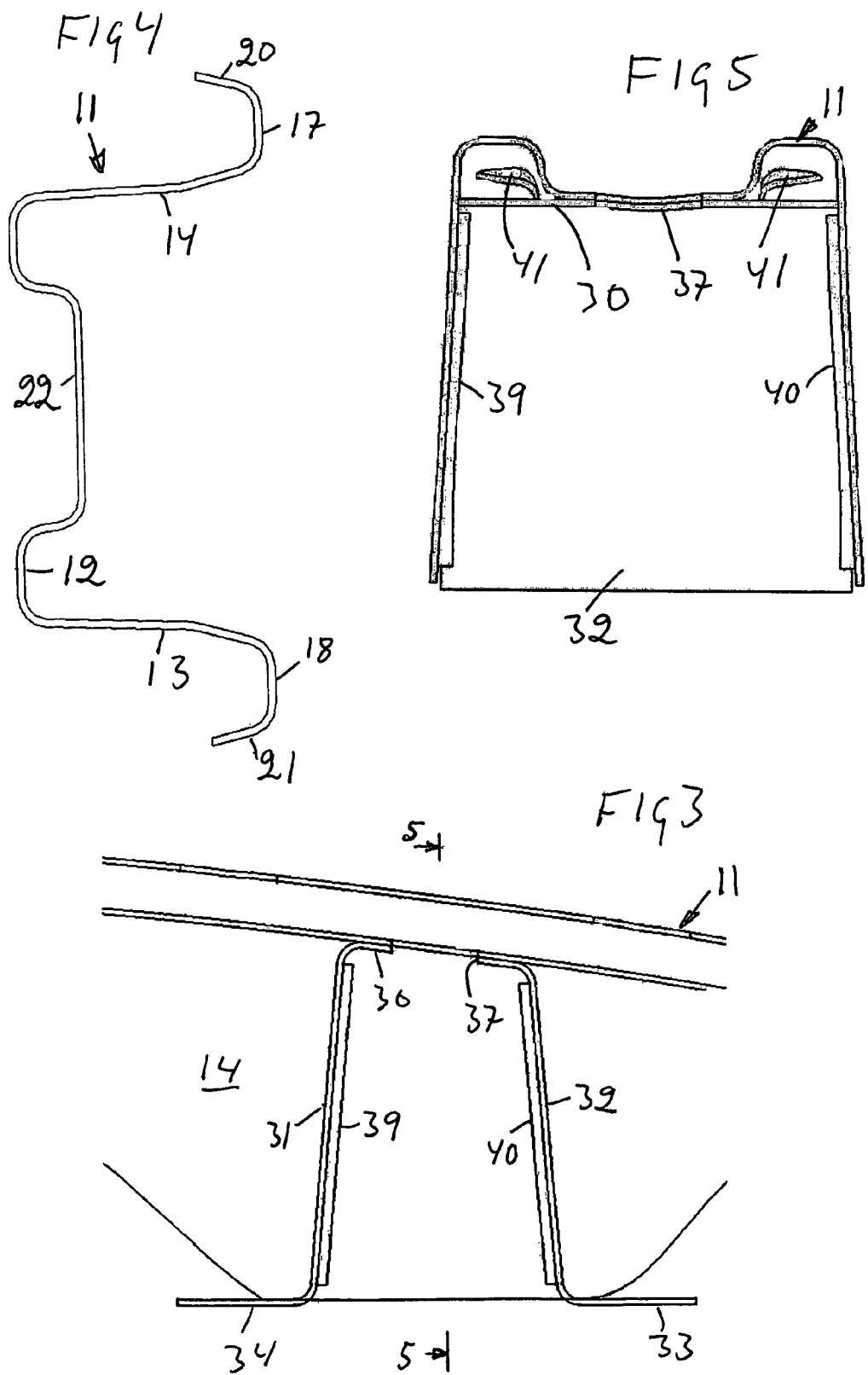

BUMPER BEAM FOR A VEHICLE

TECHNICAL FIELD

The invention relates to bumper beams having two attachment portions with a U-shaped cross section open towards the vehicle.

BACKGROUND OF THE INVENTION

Bumper beams of this kind have a tendency to twist in their attachment portions in the event of a collision which is not centred in the vertical direction. This behavior becomes especially noticeable when the attachment portions are narrow in the vertical direction and broad in the horizontal direction and act as integrated crash boxes.

OBJECT OF THE INVENTION

The aim of the invention is to provide attachment portions which have good crash properties. This problem is solved by a bumper bar according to the invention.

BRIEF DESCRIPTION OF THE DRAWINGS

FIG. 1 is a top X-ray view of an example of a bumper beam according to the invention.

FIG. 2 shows the same bumper beam as viewed from inside the vehicle according to the arrows 2 in FIG. 1.

FIG. 3 is an enlarged horizontal section through an attachment portion.

FIG. 4 is a section along the arrows 4-4 in FIG. 1.

FIG. 5 is a section along the arrows 5-5 in FIG. 1 and FIG. 3.

FIG. 6 is a perspective view of a reinforcing member forming part of the bumper beam.

DETAILED DESCRIPTION OF THE ILLUSTRATED AND PREFERRED EMBODIMENT

The drawings show a bumper beam consisting of a bar 11 with an essentially U-shaped cross section, i.e. it has a central flange 12 and two webs 13, 14. The bar 11 has two attachment portions 15, 16 with a large web height which decreases towards the centre of the bar where the bar is broader and is hat-shaped, i.e. it has side flanges 17, 18 and these side flanges moreover have upwardly bent ends 20, 21. The central flange of the bar is provided over its entire length with a central groove 22.

FIG. 6 shows a reinforcing member/attachment member 29 in the form of a hat profile, i.e. it has a central flange 30, two webs 31, 32 and two side flanges 33, 34. Each side flange has two mounting holes 35, 36. The central flange has also a hole 37. The reinforcing member is designed in such a manner that the side edges 38 of its webs 31, 32 match the webs of the bar 11 when the reinforcing member is pushed into the bar and placed across the bar. The side edges 38 are welded by means of weld beads 39, 40 to the webs 13, 14 of the bar and the webs 31, 32 of the attachment member form transverse bulkheads in the bar, as will be clear from FIGS. 3 and 5.

The central flange 12 of the bar 11 has four holes 41 immediately in front of the four mounting holes 35, 36 so that it is possible to pass bolts and a socket wrench through the holes 41 in order to fasten the bumper beam to the vehicle. Alternatively, the vehicle may have welded-on bolts such that nuts can be screwed on to these bolts through the holes 41. The two side flanges 33, 34 of the reinforcing member 29 may also alternatively be attached to the vehicle in some other manner.

The attachment portions 15, 16 act as integrated crash boxes and further crash boxes are generally not required.

The invention claimed is:

1. Bumper beam for a vehicle, said bumper beam having two attachment portions (15, 16) with a U-shaped cross section open towards the vehicle, characterised in that each said attachment portion has a reinforcing member (29) in the form of a hat-profile, located within the attachment portion and across the latter, each of the reinforcing members (29) having webs (31, 32) welded to the webs (13, 14) of each of the attachment portions, the webs (31, 32) of the reinforcing members (29) having side flanges (33, 34) for attachment to a structural part of the vehicle ,the reinforcing members being received in the attachment portions such that the webs of the reinforcing members are oriented to form transverse bulkheads in the attachment portions of the bumper beam; each said reinforcing member extending between a forwardmost position in which said reinforcing member is attached to the bumper beam, and a rearmost position in which said reinforcing member is attached to said structural part of the vehicle; said webs of said reinforcing members forming said transverse bulkheads tending to decrease twisting of the bumper beam in a collision.

2. Bumper beam according to claim 1, characterised in that the side flanges (33, 34) of the hat-profile have holes (35, 36) for fastening elements by means of which the side flanges and therefore the bumper beam can be attached to the vehicle.

3. Bumper beam according to claim 1, characterised in that the attachment portion has holes (41) to allow for the insertion of tools through these holes for the attachment of the bumper beam.

4. Bumper beam according to claim 2, characterised in that the attachment portion has holes (41) to allow for the insertion of tools through these holes for the attachment of the bumper beam.

5. Bumper beam according to claim 1, wherein both the bumper beam and each said reinforcing member have a hat-profile.

* * * * *